(12) United States Patent
Sumimoto et al.

(10) Patent No.: US 8,388,326 B2
(45) Date of Patent: Mar. 5, 2013

(54) PISTON PUMP ASSEMBLY HAVING A CYLINDER MEMBER WITH STRAIN-ABSORBING PORTIONS

(75) Inventors: Atsushi Sumimoto, Toyota (JP); Tomoo Harada, Anjyo (JP)

(73) Assignee: Advics Co., Ltd., Aichi (JP)

( * ) Notice: Subject to any disclaimer, the term of this patent is extended or adjusted under 35 U.S.C. 154(b) by 239 days.

(21) Appl. No.: 12/882,751

(22) Filed: Sep. 15, 2010

(65) Prior Publication Data
US 2011/0070112 A1 Mar. 24, 2011

(30) Foreign Application Priority Data
Sep. 18, 2009 (JP) .................. 2009-216994

(51) Int. Cl.
F04B 19/00 (2006.01)
F04B 53/10 (2006.01)

(52) U.S. Cl. ........ 417/549; 417/470; 417/545; 92/171.1

(58) Field of Classification Search .................. 417/554, 417/545, 549, 470, 471, 546; 303/87; 92/171.1
See application file for complete search history.

(56) References Cited

U.S. PATENT DOCUMENTS

| | | | |
|---|---|---|---|
| 6,161,466 A * | 12/2000 | Schuller et al. ................. | 91/422 |
| 6,171,083 B1 * | 1/2001 | Schuller ......................... | 417/549 |
| 6,217,300 B1 * | 4/2001 | Schuller et al. ................ | 417/549 |
| 6,224,352 B1 * | 5/2001 | Hauser et al. .................. | 417/313 |
| 2005/0074348 A1 * | 4/2005 | Maeda et al. ................... | 417/471 |
| 2008/0310971 A1 * | 12/2008 | Harada ........................... | 417/254 |

FOREIGN PATENT DOCUMENTS

JP 2005-113880 A 4/2005

* cited by examiner

Primary Examiner — Devon Kramer
Assistant Examiner — Nathan Zollinger
(74) Attorney, Agent, or Firm — Buchanan Ingersoll & Rooney PC

(57) ABSTRACT

A piston pump assembly includes a first pump having a first cylinder member inserted in a piston hole of a pump housing, and a first piston inserted in the first cylinder member, and a second pump having a second cylinder member inserted in the piston hole, and an annular second piston slidably fitted in an annular groove formed in the outer periphery of the first piston, and also axially slidably inserted in the second cylinder member. The first cylinder member axially presses the second cylinder member, thereby preventing the second cylinder member from being dropped out of the piston hole. The second cylinder member has an annular seal surface in contact with a shoulder surface formed on the inner periphery of the piston hole. Strain-absorbing protrusions are formed on the end of the second cylinder member in abutment with the first cylinder member. The protrusions are compressed when they are pressed by the first cylinder member.

6 Claims, 4 Drawing Sheets

US 8,388,326 B2

PISTON PUMP ASSEMBLY HAVING A CYLINDER MEMBER WITH STRAIN-ABSORBING PORTIONS

CROSS REFERENCE TO RELATED APPLICATIONS

This application is based on and claims priority under 35 U.S.C. sctn. 119 with respect to Japanese Patent Application No. 2009-216994 filed on Sep. 18, 2009, the entire content of which is incorporated herein by reference.

BACKGROUND OF THE INVENTION

This invention relates to a piston pump assembly used in hydraulic devices such as hydraulic pressure control devices, hydraulic pressure boosters and high-pressure pumps for pressure accumulators, and particularly to a piston pump assembly having a self-suction function which can by itself pressurize fluid to be drawn into a pump chamber and feed it into the pump chamber under pressure.

There is known a piston pump assembly of the type in which fluid (liquid) used as a pressure medium is pre-pressurized by a second pump, and re-pressurized by a first pump, and then discharged. A piston pump assembly of this type is disclosed e.g. in JP Patent Publication 2005-113880A (hereinafter referred to as "Patent document 1").

The first pump of the piston pump assembly disclosed in Patent document 1 includes a first cylinder member and a first piston having one end thereof axially slidably inserted in the first cylinder member, while its second pump includes a second cylinder member, and a second piston axially slidably inserted in the second cylinder member.

The second piston is an annular piston axially slidably fitted in an annular groove formed in the outer periphery of the first piston, With the piston pump assembly disclosed in Patent document 1, the second cylinder member is provided separately from the pump housing for the following reasons:

(1) Because the piston of the second pump, which is ordinarily called a "feed ring" (though it is referred to as a "slide ring" in Patent document 1), is made of rubber or a soft resin, by forming the second cylinder member from a resin, which has lower aggressiveness against the piston than the pump housing, which is made of a metal, it is possible to reduce wear of the piston.

(2) By using the second cylinder member to prevent an annular seal member which seals the outer periphery of the first piston, thereby liquid-tightly isolating a feed chamber of the second pump from a cam chamber kept at the atmospheric pressure, from being dropped out, it is possible to mount the annular seal member in a predetermined position without forming by recessing a seal member in the inner surface of the piston hole in which the first piston is inserted.

In conventional arrangements, the first and second cylinder members are fitted together with the first and second pistons mounted therein, and the thus assembled first and second cylinder members are mounted in the pump housing.

With this type of piston pump assembly, an annular seal surface of the second cylinder member is brought into close contact with an axially facing shoulder surface formed on the inner periphery of the piston hole, thereby isolating the feed chamber of the second pump defined between the outer periphery of the first piston and the inner periphery of the second piston from a fluid intake passage of the second pump formed in the outer periphery of the second piston. (This seal arrangement is called the "rod seal type".)

With this arrangement, since the seal portion for isolating the feed chamber of the second pump from the fluid intake passage is defined by the shoulder surface on the inner periphery of the piston hole and the annular seal surface of the second cylinder member, in order to ensure required sealability, the shoulder surface and the annular seal surface have to be parallel to each other with high accuracy.

In this conventional arrangement, the second cylinder member is restricted by the first cylinder member. Also, since the second cylinder member is formed by molding, it is difficult to form the second cylinder member with high accuracy compared to when it is formed by cutting. For these reasons, the position of the second cylinder member tends to change, which may cause poor contact between the shoulder surface on the inner periphery of the piston hole and the annular seal surface of the second cylinder member. This could in turn lead to leakage of fluid in the feed chamber into the intake passage through the gap between these surfaces, thus lowering the volume efficiency of the second pump, and thus detrimentally influencing the discharge capacity of the entire pump assembly, Also in the conventional arrangement, a step of fitting together the first and second cylinder members is necessary before mounting the second cylinder member in the pump housing, which reduces productivity and increases the manufacturing cost.

SUMMARY OF THE INVENTION

An object of the present invention is, in a piston pump assembly having a self-suction function in which fluid is pressurized and fed under pressure by the second pump into the first pump, to improve contact between the shoulder surface formed on the inner periphery of the piston hole and the annular seal surface of the second cylinder member, thereby improving the discharge capacity of the pump assembly and reducing the product cost.

In order to achieve this object, the present invention provides a piston pump assembly of the rod seal type which comprises:

a first pump including a first cylinder member inserted in a piston hole and defining a pump chamber, and a first piston having one end portion thereof axially slidably inserted in the first cylinder member so as to protrude into the pump chamber; and a second pump including a second cylinder member inserted in the piston hole, and an annular second piston axially slidably fitted in an annular groove formed in an outer periphery of the first piston, and also axially slidably inserted in the second cylinder member;

the first cylinder member axially pressing the second cylinder member, thereby preventing the second cylinder member from being dropped out of the piston hole;

wherein the second cylinder member has an annular seal surface kept in contact with an axially facing shoulder surface formed on an inner periphery of the piston hole, thereby sealing between inner and outer peripheries of the second cylinder member; and wherein a strain-absorbing portion made of a material softer than the first cylinder member is provided at one end of the second cylinder member remote from the annular seal surface, or at one end of the first cylinder member in abutment with the one end of the second cylinder member, the strain-absorbing portion being configured to be axially compressed and deformed when the strain-absorbing portion is pressed by the first cylinder member.

The strain-absorbing portion may comprise a protrusion provided at the one end of the second cylinder member and protruding axially in the direction in which the end portion of the first piston protrudes into the pump chamber. The strain-absorbing portion may be partially plastically deformed but is configured such that its elastic deformation is mainly compression deformation.

In the arrangement in which the strain-absorbing portion comprises a protrusion provided at the one end of the second cylinder member, it is preferable that the second cylinder member has an annular peripheral wall in which a plurality of circumferentially spaced apart openings are formed to extend from inner to outer peripheries of the annular peripheral wall, the openings constituting fluid intake passages through which fluid is drawn into a feed chamber of the second pump, and that there are a plurality of the protrusions which are provided at positions corresponding, respectively, to portions of the annular peripheral wall connecting together the respective adjacent pairs of openings.

In one preferred arrangement, the strain-absorbing portion and the second cylinder member are seamlessly and integrally formed from a material which is softer than the first cylinder member and also softer than the pump housing, in which the piston hole is formed. In another preferred arrangement, the first and second cylinder members have first and second main bodies, respectively, and the strain-absorbing portion is made of a different material from one of the first and second main bodies and integrally joined to the one of the first and second main bodies.

In still another preferred arrangement, at least one of the circumferential and radial dimensions of the protrusion provided on one of the first and second cylinder members as the strain-absorbing portion decreases from a proximal end of the protrusion toward a distal end of the protrusion. In yet another preferred arrangement, the piston pump assembly further comprises an annular seal member inserted in the piston hole and sealing a gap between the outer periphery of the first piston and the inner periphery of the piston hole, wherein the second cylinder member is configured to prevent the annular seal member from being dropped out of the piston hole.

With the piston pump according to the present invention, the first cylinder member, which is in abutment with the second cylinder member, which is inserted in the piston hole, axially presses the second cylinder member, thereby pressing the second cylinder member against the shoulder surface on the inner periphery of the piston hole, Simultaneously, the strain-absorbing portion provided on the second cylinder member or the first cylinder member is axially compressed.

From another aspect of the invention, there is provided a piston pump assembly comprising:

a first pump including a first piston inserted in a piston hole;

a second pump including a cylinder member inserted in the piston hole, and an annular second piston axially slidably fitted in an annular groove formed in an outer periphery of the first piston, and also axially slidably inserted in the cylinder member; and an anti-separation member inserted in and fixed to the piston hole, the anti-separation member axially pressing the cylinder member, thereby preventing the cylinder member from being dropped out of the piston hole;

wherein the cylinder member has an annular seal surface kept in contact with an axially facing shoulder surface formed on an inner periphery of the piston hole, thereby sealing between inner and outer peripheries of the cylinder member; and wherein a strain-absorbing portion made of a material softer than the anti-separation member is provided at one end of the cylinder member remote from the annular seal surface, or at one end of the anti-separation member in abutment with the one end of the cylinder member, the strain-absorbing portion being configured to be axially compressed and deformed when the strain-absorbing portion is pressed by the anti-separation member.

In the preferred embodiment, the first cylinder member of the first pump serves as the above-described anti-separation member.

If the annular seal surface of the second cylinder member and the shoulder surface on the inner periphery of the piston hole are not exactly parallel to each other at this time, the strain-absorbing portion is compressed so as to correct the position of the second cylinder member with reference to the shoulder surface on the inner periphery of the piston hole such that the annular seal surface is exactly parallel to the shoulder surface.

If the end of the second cylinder member remote from the annular seal surface is not parallel to the surface of the first cylinder member pressing this end of the second cylinder member, circumferentially spaced apart sections of the strain-absorbing portion are compressed to different degrees from each other such that the end of the second cylinder member becomes parallel to the pressing surface of the first cylinder member. Also, since the second cylinder member is not restricted by the first cylinder member, the position of the second cylinder member is corrected with reference to the shoulder surface on the inner periphery of the piston hole.

With this arrangement, it is possible to keep the annular seal surface of the second cylinder member parallel to the shoulder surface on the inner periphery of the piston hole, which ensures close contact between these surfaces, and thus ensures a reliable seal between the inner and outer peripheries of the second cylinder member.

According to this invention, for the above-described reasons, leakage of fluid from the feed chamber of the second pump, to the intake passage is reliably prevented, so that the fluid discharge capacity of the pump assembly improves.

By providing the strain-absorbing portion, simply by bringing the first cylinder member into abutment with the second cylinder member, the second cylinder member is pressed and held in position by the first cylinder member without the need to fit the first and second cylinder member together beforehand. This increases productivity of the pump assembly and reduces its production cost.

In the arrangement in which the strain-absorbing portion comprises a protrusion provided on the second cylinder member, the entire second cylinder, including the protrusion, may be formed by molding a resin, thus further reducing the production cost.

In the arrangement in which a plurality of circumferentially spaced apart openings as fluid intake passages are formed to extend from the inner to outer peripheries of the annular peripheral wall of the second cylinder member, and a plurality of protrusions as strain-absorbing portions are formed on the second cylinder member at positions corresponding, respectively, to portions of the annular peripheral wall connecting together the respective adjacent pairs of openings, since axial force is applied from the first cylinder member to portions of the second cylinder member having sufficient strength, it is possible to prevent breakage of portions of the second cylinder that are relatively low is strength.

It is also possible to prevent transmission loss due to deformation of the portions of the second cylinder portion where the openings are formed, which makes it possible to stably press the annular seal surface against the shoulder surface on the inner periphery of the piston hole, With the arrangement in which the strain-absorbing portion is made of a material different from the material of the body of the second cylinder member or that of the body of the first cylinder member, it is possible to more freely select the material for the bodies of the first and second cylinder members. This is advantageous if it is necessary to make the bodies of the first and second cylinder members from different materials in order to individually meet the required properties for the first and second cylinder members, respectively.

In the arrangement in which at least one of the circumferential and radial dimensions of the protrusion provided on one of the first and second cylinder members decreases from a proximal end of the protrusion toward a distal end of the protrusion can be deformed smoothly as the pressing force that tends compress the protrusions changes, In the arrangement in which the second cylinder member is made of a material softer than the material of the member in which the piston hole is formed, elastic deformation of the annular seal surface additionally serves to absorb strain. For high sealability, the seal surface area of the annular seal surface is preferably as uniform as possible in the circumferential direction. Thus, it is preferable that the annular seal surface can be elastically deformed if the strain of the second cylinder member is not sufficiently absorbed by the strain-absorbing portion.

DETAILED DESCRIPTION OF THE PREFERRED EMBODIMENTS

Now the piston pump assemblies embodying the present invention are described with reference to FIGS. 1 to 4.

Figure 1:
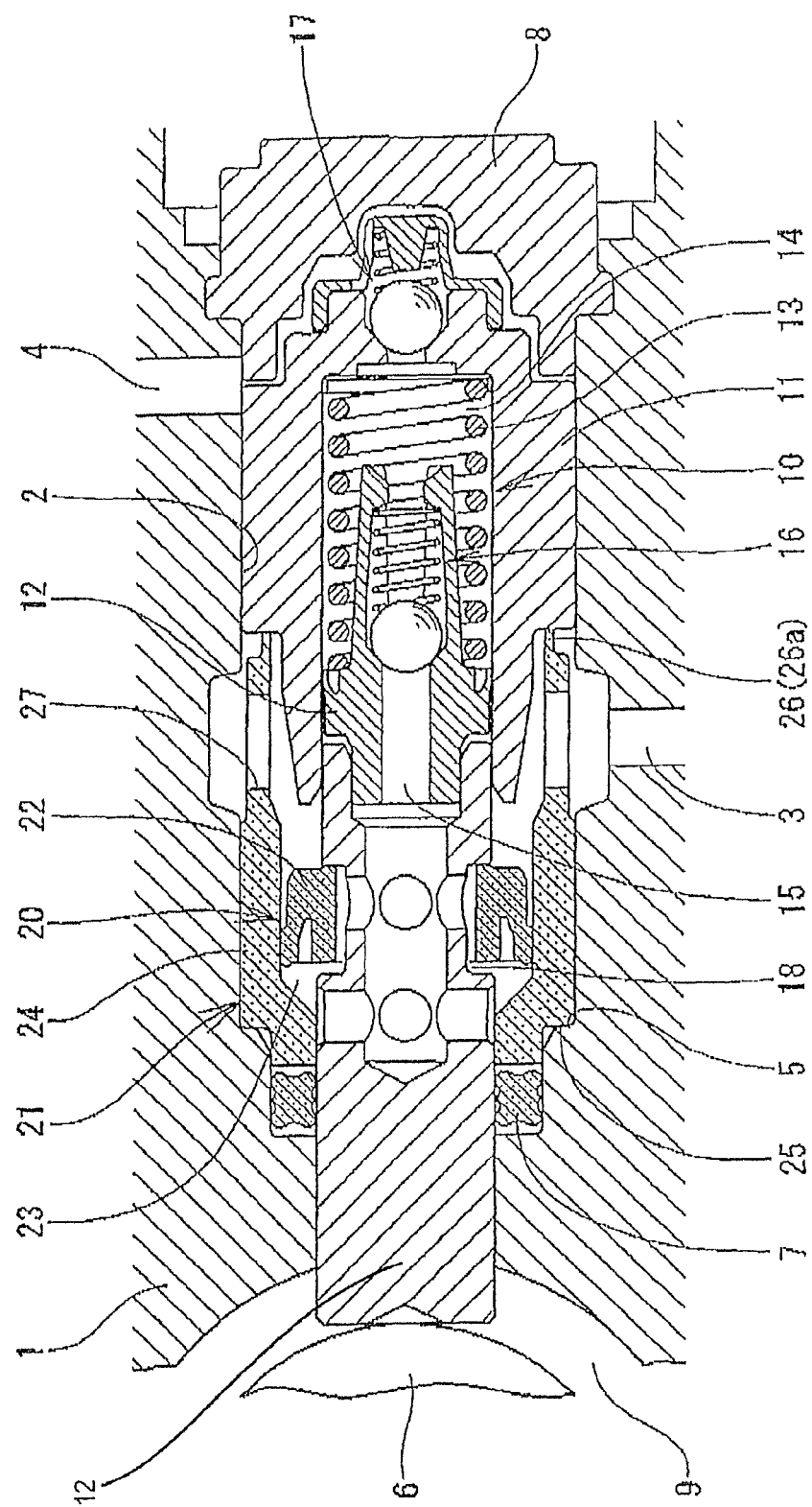
FIG. 1 is a sectional view of a heat pump assembly embodying the present invention.

The piston pump assembly shown in FIG. 1 comprises a pump housing 1, a first pump 10, a second pump 20, an eccentric cam 6 for driving the first and second pumps, and an annular seal member 7, which is described below.

The pump housing 1 is formed with a piston hole 2, a fluid inlet port 3 communicating with the piston hole 2, and a discharge port 4 through which fluid drawn by the pumps are discharged. The first and second pumps 10 and 20 are mounted in the piston hole 2. The inlet of the piston hole 2 is liquid-tightly sealed by an end plug 8. The outlet of the first pump 10 communicates with the discharge port 4 through a chamber defined by the inner surface of the end plug 8.

The first pump 10 includes a first cylinder member 11 mounted in the piston hole 2, a first piston 12 having one end thereof slidably inserted in the first cylinder member 11, and a return spring 13 biasing the first piston 12 toward its home position. The first pump 10 further includes a pump chamber 14 defined between the first cylinder member 11 and the one end of the first piston 12, an intake passage 15 extending from the second pump 20 to the pump chamber 14, an intake valve 16 for opening and closing the intake passage 15, and a discharge valve 17 for opening and closing the outlet of the pump chamber 14.

The intake passage 15, which is formed through the first piston 12, the intake valve 16, which is provided in the intake passage 15, and the discharge valve 17, which is provided between the pump chamber 14 and the discharge port 4, are all known from e.g. the above-mentioned JP Patent Publication 2005-113880A. Thus, description of these elements is omitted here.

The second piston 20 comprises a second cylinder member 21 mounted in the piston hole 2, and a second piston 22 (which is, in the embodiment shown, a feed ring comprising a cup seal) slidably mounted in the second cylinder member 21, with a feed chamber 23 defined between the outer periphery of the second piston 22 and the second cylinder member 21.

The second piston 22 is an annular piston axially slidably fitted in an annular groove 18 formed in the outer periphery of the first piston 12 and also slidably inserted in the second cylinder member 21.

The second pump 20 is disposed between the inlet port 3 and the intake passage 15 formed in the first piston 12.

The eccentric cam 6 is disposed in a cam chamber 9 which is kept at the atmospheric pressure, and rotated by a drive shaft, not shown, when necessary. The first pump 10 is actuated as the first piston 12 is repeatedly pushed rightwardly in FIG. 1 by the cam 6 and pushed back under the force of the return spring 13 when the cam 6 retreats.

When the first piston 12 moves in the direction to pressurize the fluid in the pump chamber 14 (rightwardly in FIG. 1), the second piston 22 of the second pump 20 separates from one of the end walls of the annular groove 18 remote from the feed chamber 23, thereby opening a valve portion at the inlet of the feed chamber 23, which is defined by the end wall of the annular groove 18 remote from the feed chamber 23 and the radially inner end surface of the second piston 22 which is adapted to be brought into and out of contact with the end wall of the annular groove. As a result, fluid is drawn into the feed chamber 23 through the intake port 3.

When the first piston 12 moves in the direction to expand the volume of the pump chamber 14 (leftwardly in FIG. 1), the second piston 22 comes into contact with the end wall of the annular 18 remote from the feed chamber 23, thereby closing the valve portion at the inlet of the feed chamber 23. At this time, since the second piston 22 moves following the first piston 12, fluid in the feed chamber 23 is pushed out and drawn into the pump chamber 14 through the intake valve 16. Since the operation of the second piston 20 is well known in the art, its further detailed description is omitted here.

The annular seal member 7 is inserted in the piston hole 2 to seal between the piston hole 2 and the first piston 12 inserted in the piston hole 2. In the embodiment, the second cylinder member 21 is used as a stopper for preventing the seal member 7 from coming out of the piston hole 2. But instead, the annular seal member 7 may be fitted in an annular seal groove formed in the outer periphery of the first piston 12. In this case, it is not necessary to use the second cylinder member 21 as a stopper for preventing separation of the seal member 21. This annular seal member 7 is also well known in the related art.

The characterizing feature of the present invention lies in abutting portions of the second cylinder member 21 and the member for axially pressing the second cylinder member 21, thereby preventing the second cylinder member from coming out of the piston hole 2. The second cylinder member 21 has an annular seal surface 25 which is kept in contact with an axially facing shoulder surface 5 formed on the inner periphery of the piston hole 2, thereby closing a gap between the second cylinder member 21 and the piston hole 2. At its end remote from the annular seal surface 25, the second cylinder member 21 has strain-absorbing portions 26 comprising protrusions 26a protruding axially in the direction in which the one end of the first piston 12 protrudes into the pump chamber 14. The strain-absorbing portions 26 constitute the characterizing feature of the present invention. The strain-absorbing portions 26 (protrusions 26a) are made of a material softer than the material forming the first cylinder member 11.

With this piston pump assembly, the first cylinder member 11, which is press-fitted in the piston hole 2 and fixed to the piston hole 2, also serves as an anti-separation member for axially pressing the second cylinder member 21, thereby preventing it from being dropped out of the piston hole 2.

Figure 2:
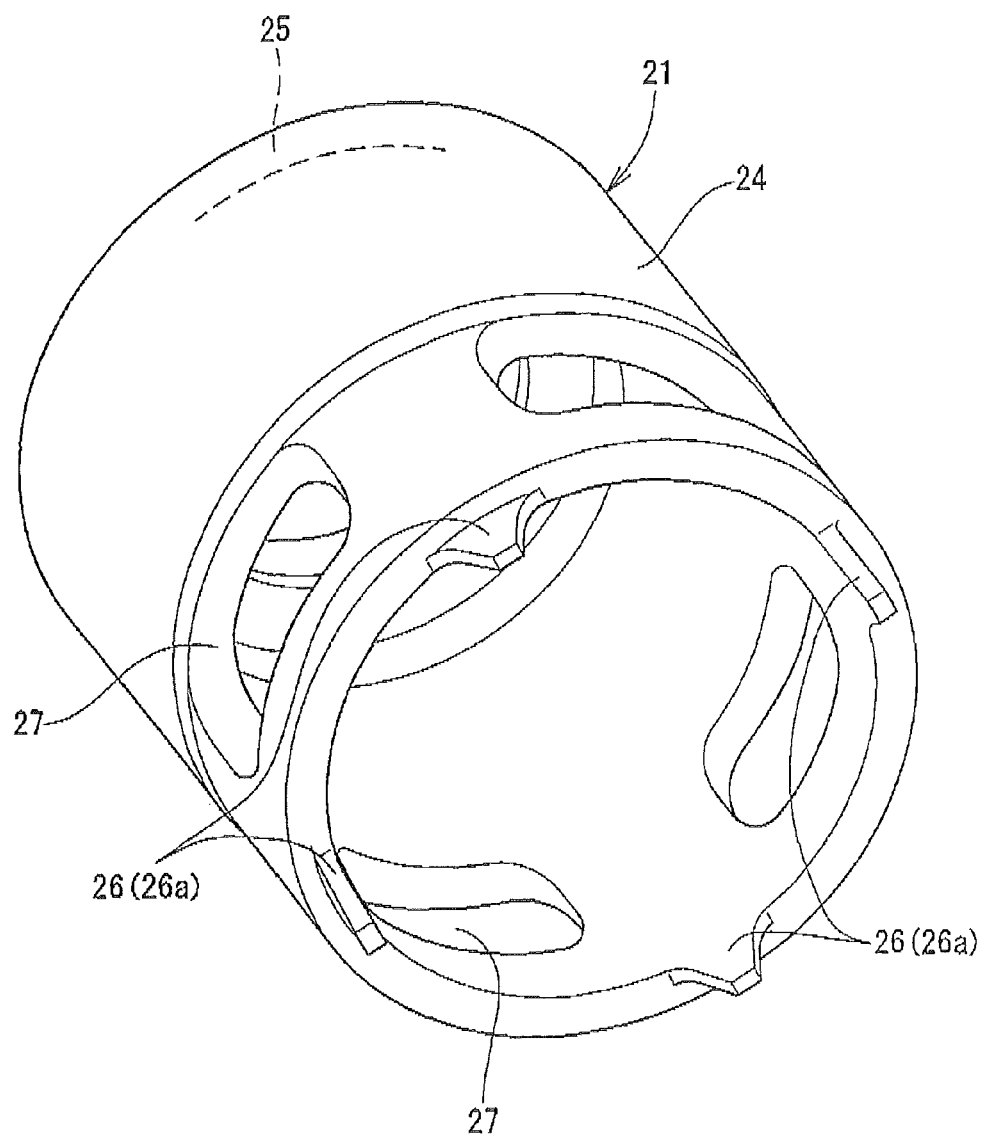
FIG. 2 is a perspective view of a second cylinder member used in the piston pump assembly of FIG. 1.
Figure 3:
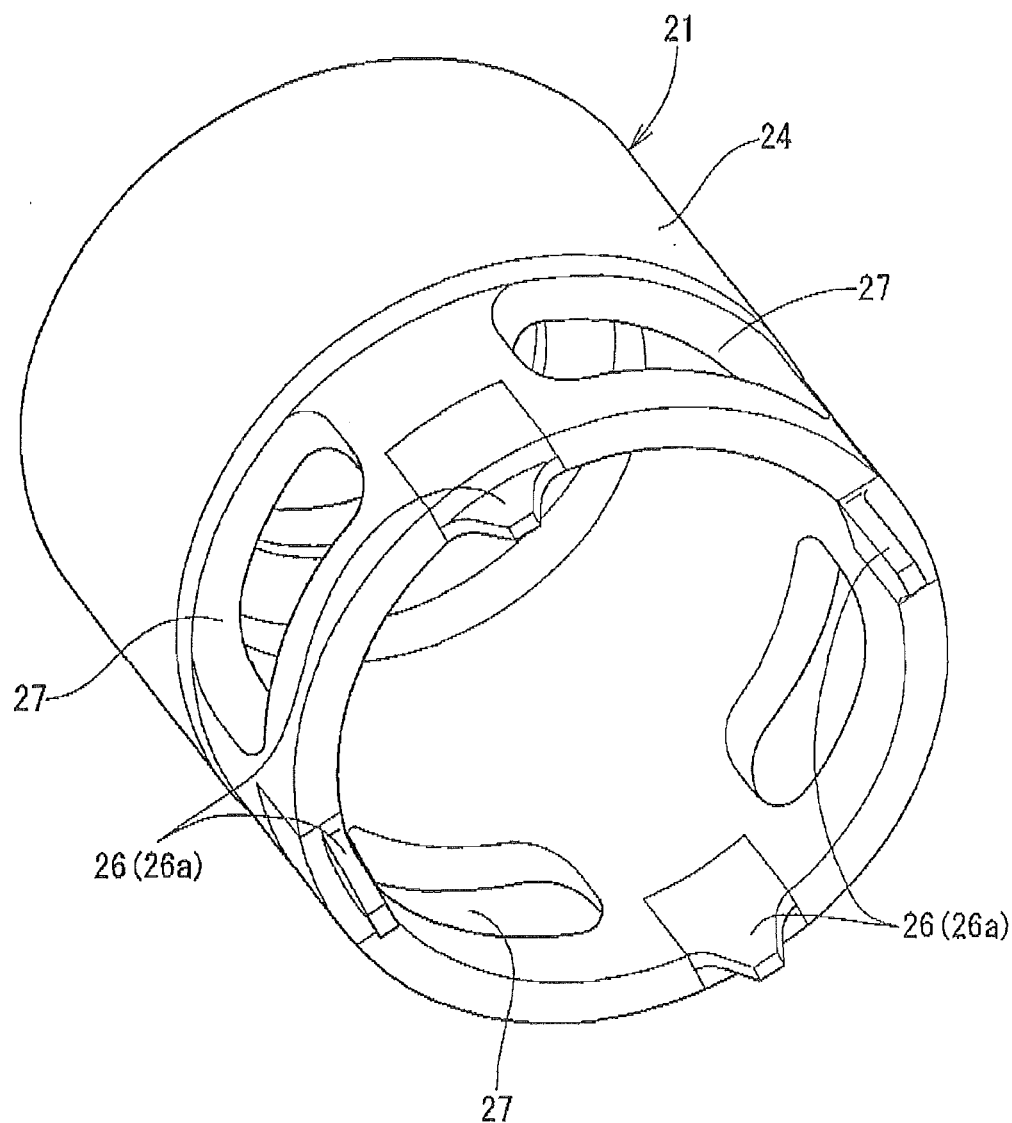
FIG. 3 is a perspective view of a different second cylinder member used in the piston pump assembly of FIG. 1.

The second cylinder member 21 shown is formed by molding a resin, such as polyphenylene sulfide (PPS) resin or polyamide 66 (PA66) resin. As shown in FIG. 2, the protrusions 26a of the second cylinder member 21 of this embodiment are made of the same material as the material forming its main body 24 so as to be seamlessly integrated with the main body 24. Thus, the entire second cylinder member 21, including the protrusions 26a, is softer than the material forming the first cylinder member 11, and also softer than the pump housing 1, in which the piston hole 2 is formed. The pump housing 1 is made of e.g. an aluminum alloy.

As shown in FIG. 2, the annular peripheral wall of the main body 24 is formed with a plurality of circumferentially spaced apart openings 27 extending therethrough from its outer periphery to inner periphery, thereby forming fluid passages through which fluid is drawn into the feed chamber 23. The protrusions 26a are provided at positions corresponding to the portions of the wall 24 connecting together the respective adjacent pairs of openings 27.

Preferably, the protrusion 26a are thinner than the annular peripheral wall, or are shaped such that at least one of their circumferential dimension and radial dimension gradually decreases from their proximal to distal ends, because such protrusions can smoothly deform following changes in the axial pressing force. The protrusions 26a are compressed to a greater degree as the axial pressing force increases. Thus, the protrusions 26a are always deformed to the same degree if the pressing force is the same. The plurality of circumferentially spaced apart protrusions 26a at a constant pitch as shown are preferable because they are easily deformable. But instead, a single annular protrusion may be provided. Such a single annular protrusion should have a reduced thickness at its free end portion so that it is deformable smoothly to absorb strain.

The protrusion or protrusions 26a may be made of a different material from the material forming the main body 24 of the second cylinder member 21 and integrally joined to the main body 24, provided this does not poses any serious manufacturing problem. This arrangement permits greater freedom in selecting the materials for the protrusion(s) and the main body. For example, this arrangement makes it possible to form the protrusion(s) 26a from a soft material and form the main body 24 from a wear-resistant material.

Figure 4:
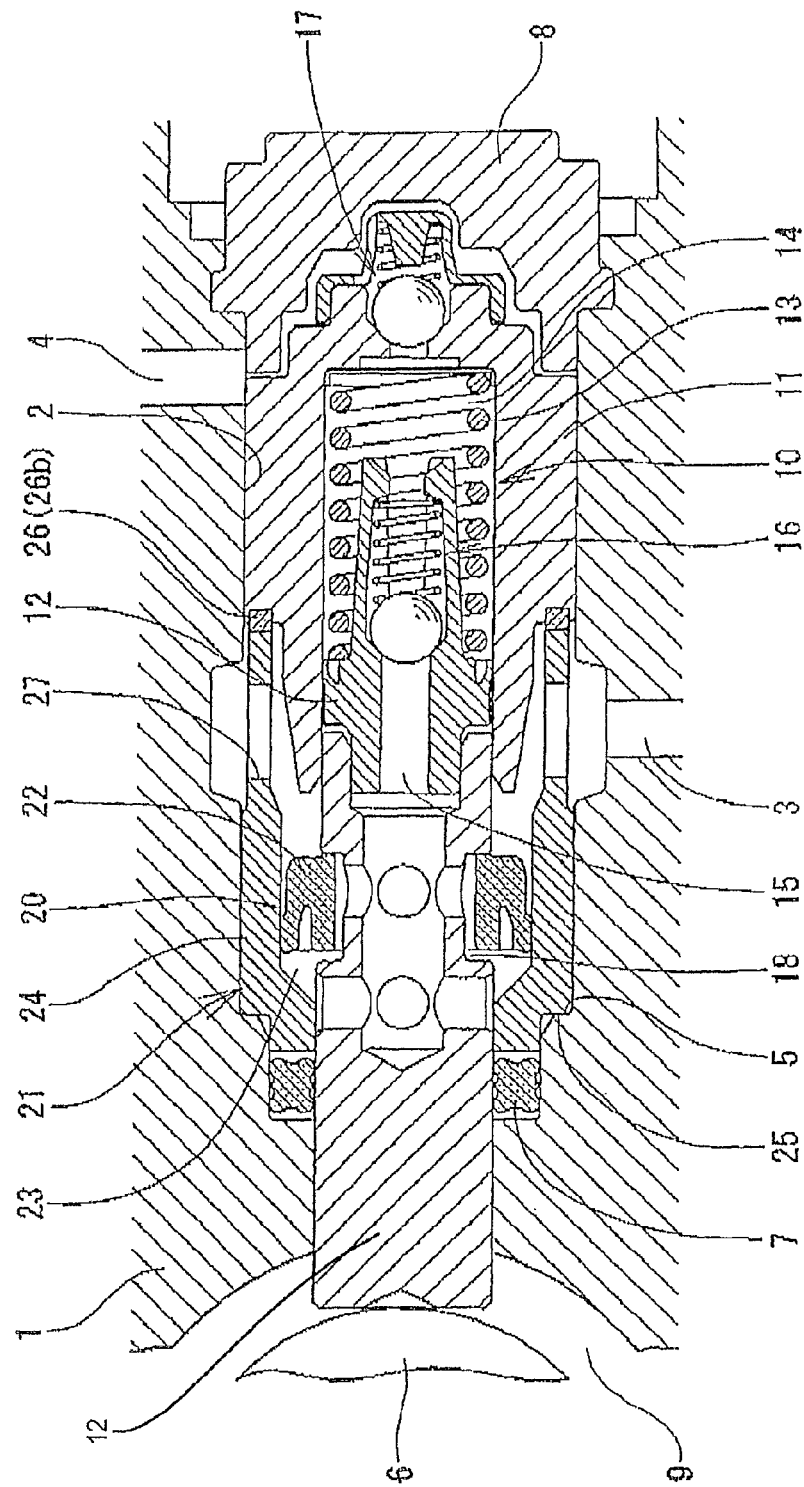
FIG. 4 is a sectional view of a different piston pump assembly embodying the present invention.

FIG. 4 shows an arrangement in which the strain-absorbing portions 26 are formed on the first cylinder member 11. Since high pressure produced by the first pump 10 acts on the outer surface of the first cylinder member 11, the first cylinder member 11 is made of a material having high rigidity, such as iron. The strain-absorbing portions 26 comprise soft members 26b made of a material softer than the first cylindrical member 11, such as resin, and embedded in the end surface of the first cylinder 11 pressed against the second cylinder member 21.

According to the material forming the second piston 22, the second cylinder member 21 may be made of a metal. With either of the arrangements of FIGS. 3 and 4, the material forming the second cylinder member 21 is not limited. For example, the second cylinder member 21 may be made of the same material as the material forming the first cylinder member 11.

With the piston pump assembly according to this invention, if a gap forms between the second cylinder member 21 and the anti-separation member (or first cylinder member 11) which axially presses the second cylinder member due e.g, to dimension errors, the circumferentially spaced apart strain-absorbing portions 26, which are provided between the first and second cylinder members 11 and 21, are compressed to different degrees, thereby absorbing the gap.

Thus, the second cylinder member 21 is positioned with reference to the shoulder surface on the inner periphery of the piston hole. This makes it possible to keep the annular seal surface parallel to the shoulder surface, which in turn prevent leakage of fluid from the feed chamber of the second pump into the intake side, thus improving the fluid discharge capacity of the pump assembly.

The piston pump assembly according to the present invention can be used as a hydraulic pressure source for a hydraulic pressure control device, a hydraulic pressure booster or high-pressure pumps for pressure accumulators in a vehicle brake assembling having electronic control function such as an anti-lock brake system (ABS) or an electronic stability control (ESC).

What is claimed is:

1. A piston pump assembly comprising:
a first pump including a first cylinder member inserted in a piston hole and defining a pump chamber, and a first piston having one end portion thereof axially slidably inserted in said first cylinder member so as to protrude into said pump chamber;
a second pump including a second cylinder member inserted in the piston hole, and an annular second piston axially slidably fitted in an annular groove formed in an outer periphery of said first piston, and also axially slidably inserted in said second cylinder member;
said first cylinder member axially pressing said second cylinder member, thereby preventing the second cylinder member from being dropped out of the piston hole;
wherein said second cylinder member has an annular seal surface kept in contact with an axially facing shoulder surface formed on an inner periphery of the piston hole, thereby sealing between inner and outer peripheries of said second cylinder member;
wherein strain-absorbing protrusions made of a material softer than said first cylinder member are provided at one end of the second cylinder member remote from the annular seal surface said strain-absorbing protrusions being configured to be axially compressed and deformed when said strain-absorbing protrusions are pressed by the first cylinder member;
wherein said second cylinder member has an annular peripheral wall in which a plurality of circumferentially spaced apart openings are formed to extend from inner to outer peripheries of the annular peripheral wall, said openings constituting fluid intake passages through which fluid is drawn into a feed chamber of the second pump; and wherein said strain-absorbing protrusions protrude axially in the direction in which said one end portion of said first piston portion protrudes into the pump chamber, and wherein said strain-absorbing portions are provided at positions corresponding, respectively, to portions of the annular peripheral wall connecting together the respective adjacent pairs of openings.

2. The piston pump assembly of claim 1 wherein said piston hole is formed in a pump housing, and wherein said strain-absorbing protrusions and said second cylinder member are seamlessly and integrally formed from a material which is softer than the first cylinder member and also softer than the pump housing.

3. The piston pump assembly of claim 1 wherein said first and second cylinder members have first and second main bodies, respectively, and wherein said strain-absorbing protrusions are made of a different material from one of said first and second main bodies and integrally joined to said one of said first and second main bodies.

4. The piston pump assembly of claim 1 wherein said strain-absorbing protrusions each have first and second dimensions in circumferential and radial directions of the first and second cylinder members, respectively, wherein at least one of said first and second dimensions decreases from a proximal end of the protrusion toward a distal end of the protrusion.

5. The piston pump assembly of claim 1 further comprising an annular seal member inserted in the piston hole and sealing a gap between the outer periphery of the first piston and the inner periphery of the piston hole, wherein said second cylinder member is configured to prevent said annular seal member from being dropped out of the piston hole.

6. A piston pump assembly comprising:
a first pump including a first piston inserted in a piston hole;
a second pump including a cylinder member inserted in the piston hole, and an annular second piston axially slidably fitted in an annular groove formed in an outer periphery of said first piston, and also axially slidably inserted in said cylinder member;
an anti-separation member inserted in and fixed to the piston hole, said anti-separation member axially pressing said cylinder member, thereby preventing the cylinder member from being dropped out of the piston hole;
wherein said cylinder member has an annular seal surface kept in contact with an axially facing shoulder surface formed on an inner periphery of the piston hole, thereby sealing between inner and outer peripheries of said cylinder member;
wherein strain-absorbing protrusions made of a material softer than said anti-separation member are provided at one end of the cylinder member remote from the annular seal surface, said strain-absorbing protrusions being configured to be axially compressed and deformed when said strain-absorbing protrusions are pressed by the anti-separation member;
wherein said cylinder member has an annular peripheral wall in which a plurality of circumferentially spaced apart openings are formed to extend from inner to outer peripheries of the annular peripheral wall, said openings constituting fluid intake passages through which fluid is drawn into a feed chamber of the second pump; and
wherein said strain-absorbing protrusions protrude in an axial direction and are provided at positions corresponding, respectively, to portions of the annular peripheral wall connecting together the respective adjacent pairs of openings.

* * * * *